(12) United States Patent
Yamashita et al.

(10) Patent No.: US 12,287,636 B2
(45) Date of Patent: Apr. 29, 2025

(54) TRANSPORTATION SYSTEM

(71) Applicant: HONDA MOTOR CO., LTD., Tokyo (JP)

(72) Inventors: Akifumi Yamashita, Wako (JP); Katsuyoshi Watari, Wako (JP); Kiyozumi Unoura, Wako (JP); Kazuhisa Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 249 days.

(21) Appl. No.: 17/690,758

(22) Filed: Mar. 9, 2022

(65) Prior Publication Data

US 2022/0300004 A1    Sep. 22, 2022

(30) Foreign Application Priority Data

Mar. 18, 2021  (JP) ................... 2021-044345

(51) Int. Cl.
*G05D 1/02* (2020.01)
*B25J 9/16* (2006.01)
(Continued)

(52) U.S. Cl.
CPC ............ *G05D 1/0221* (2013.01); *B25J 9/162* (2013.01); *B25J 9/163* (2013.01); *B25J 9/1679* (2013.01);
(Continued)

(58) Field of Classification Search
None
See application file for complete search history.

(56) References Cited

U.S. PATENT DOCUMENTS

| | | | | |
|---|---|---|---|---|
| 6,154,658 A | * | 11/2000 | Caci | ........... H04M 11/04 455/66.1 |
| 2011/0106362 A1 | * | 5/2011 | Seitz | ........... G05D 1/0214 701/24 |

(Continued)

FOREIGN PATENT DOCUMENTS

| | | |
|---|---|---|
| JP | 2017-138132 A | 8/2017 |
| JP | 2020-149394 A | 9/2020 |

(Continued)

OTHER PUBLICATIONS

English Translation for KR 2023-0029385 A (Year: 2023).*

(Continued)

*Primary Examiner* — Jason Holloway
(74) *Attorney, Agent, or Firm* — Rankin, Hill & Clark LLP

(57) ABSTRACT

A transportation system includes map information storage means configured to store map information including travel road additional information about travel roads of an autonomous traveling transporter for transporting a load and inclination of the travel roads, collected information acquisition means configured to acquire collected information collected through autonomous traveling of the transporter on the travel roads, map information update means configured to update the travel road additional information of the map information corresponding to the travel roads autonomously traveled by the transporter based on the collected information, and a travel plan unit configured to identify a travel plan of the transporter autonomously traveling to transport the load, based on the map information including the travel road additional information and travel tolerance PB indicating tolerance of the load with respect to traveling.

5 Claims, 5 Drawing Sheets

(51) Int. Cl.
    *B25J 13/08*     (2006.01)
    *B25J 19/02*     (2006.01)
    *G05D 1/00*     (2006.01)

(52) U.S. Cl.
    CPC ............ *B25J 9/1694* (2013.01); *B25J 13/08* (2013.01); *B25J 19/023* (2013.01); *G05D 1/0223* (2013.01); *G05D 1/0246* (2013.01)

(56) References Cited

U.S. PATENT DOCUMENTS

| | | | | |
|---|---|---|---|---|
| 2011/0231050 A1* | 9/2011 | Goulding | ............ | G05D 1/0891 180/8.1 |
| 2021/0096572 A1* | 4/2021 | Jang | ......................... | G06N 3/08 |

FOREIGN PATENT DOCUMENTS

| | | | |
|---|---|---|---|
| JP | 2020-181485 | | 11/2020 |
| KR | 10-2019-0117417 A | | 10/2019 |
| KR | 20230029385 A | * | 3/2023 |
| WO | 2019/176230 A1 | | 9/2019 |

OTHER PUBLICATIONS

Japanese Office Action dated Jul. 2, 2024 issued in corresponding Japanese application No. 2021-044345; English translation included (13 pages).
Japanese Office Action Corresponding to JP Application No. 2021-044345, dated Oct. 1, 2024, 13 pages.

* cited by examiner

TRANSPORTATION SYSTEM

INCORPORATION BY REFERENCE

The present application claims priority under 35 U.S.C. § 119 to Japanese Patent Application No. 2021-044345 filed on Mar. 18, 2021. The content of the application is incorporated herein by reference in its entirety.

BACKGROUND OF THE INVENTION

Field of the Invention

The present invention relates to a transportation system.

Description of the Related Art

In unmanned transfer vehicles that move along travel routes, there is known an unmanned transfer vehicle that prevents collapse of mounted workpieces and deviation from a travel route by reducing the traveling speed in the case where the condition of the road surface in front of the unmanned transfer vehicle in the advancing direction is bad and it is determined that the vibration amplitude becomes large (for example, see Japanese Patent Laid-Open No. 2020-181485).

However, allowable vibrations differ depending on loads, and in the conventional techniques, a load may be damaged during traveling.

The present invention has an object to provide a transportation system capable of suppressing damage or degradation to a load during transportation.

SUMMARY OF THE INVENTION

An aspect of the present invention provides a transportation system which includes an autonomous traveling transporter configured to transport a load, the system comprising map information storage means configured to store map information including travel road additional information about travel roads of the transporter and inclination of the travel roads, collected information acquisition means configured to acquire collected information collected through autonomous traveling of the transporter on the travel roads, map information update means configured to update the travel road additional information of the map information corresponding to the travel roads autonomously traveled by the transporter based on the collected information, and a travel plan unit configured to identify a travel plan of the transporter autonomously traveling to transport the load, based on the map information including the travel road additional information and travel tolerance indicating tolerance of the load with respect to traveling.

Another aspect of the present invention provides the above-described transportation system in which the travel plan unit identifies the travel plan based on the map information, the travel tolerance, and traveling performance of the transporter.

Another aspect of the present invention provides the above-described transportation system in which the travel plan includes a travel route to be autonomously traveled by the transporter or a traveling state of the transporter during autonomous traveling.

Another aspect of the present invention provides the above-described transportation system in which the travel road additional information includes road surface information including structural or physical information of a road surface causing inclination.

Another aspect of the present invention provides the above-described transportation system in which the travel road additional information includes traveling index information including information indicating correspondence between a traveling state and vibration.

Another aspect of the present invention provides the above-described transportation system in which the traveling index information includes correspondence between inertia information and vibration of the transporter.

Another aspect of the present invention provides the above-described transportation system in which the above-described travel tolerance of the load includes information indicating resistance of contents of the load to damage or the like caused by inclination.

Another aspect of the present invention provides the above-described transportation system in which the travel tolerance of the load includes information indicating resistance of contents of the load to damage caused by vibration.

Another aspect of the present invention provides the above-described transportation system in which, when the transporter transports a plurality of loads, the travel plan unit identifies the travel plan based on the travel tolerance which is the lowest among the loads.

An aspect of the present invention makes it possible to suppress damage or degradation to a load during transportation.

DETAILED DESCRIPTION OF THE PREFERRED EMBODIMENT

Hereinafter, an embodiment of the present embodiment will be described with reference to the drawings.

Figure 1:
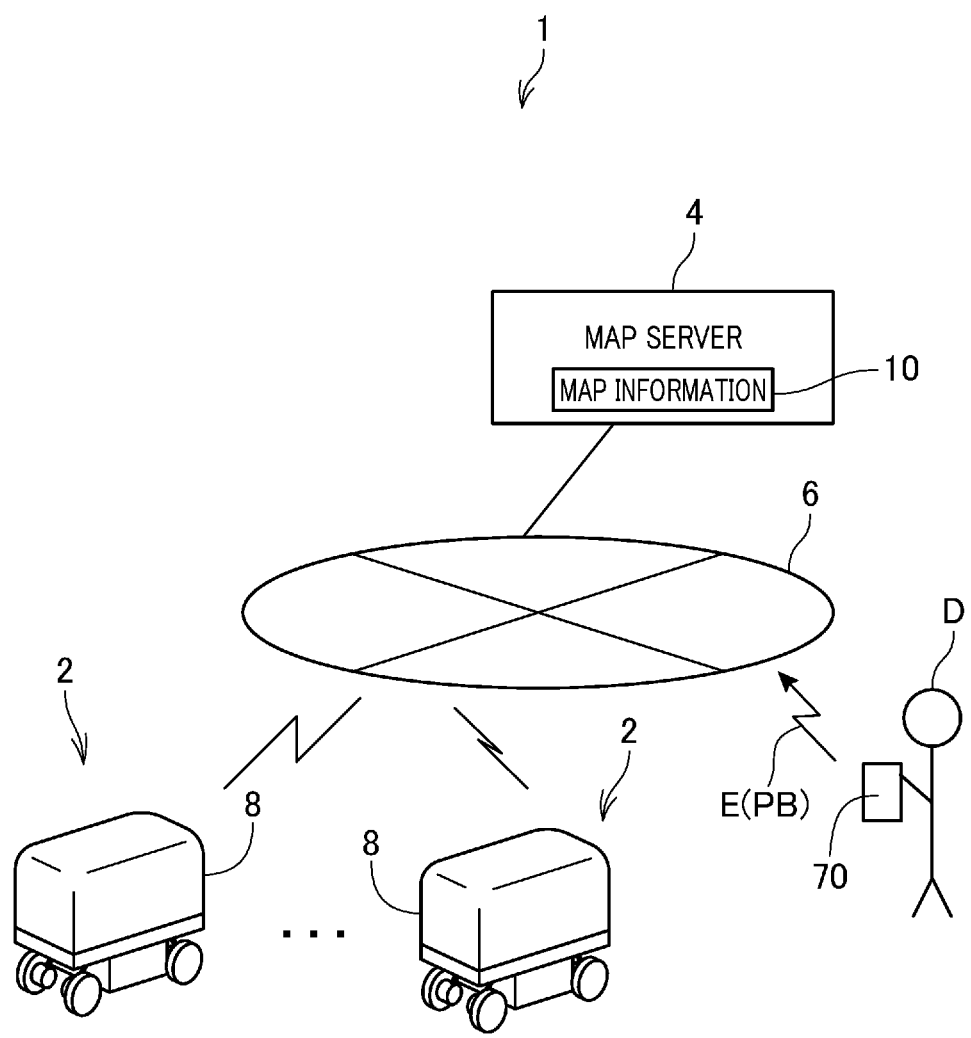
FIG. 1 is a diagram illustrating a configuration of a transportation system according to an embodiment of the present invention.

FIG. 1 is a diagram illustrating a configuration of a transportation system 1 according to the present embodiment.

As illustrated in FIG. 1, the transportation system 1 is a system that includes a plurality of autonomous traveling transporters 2, and a map server 4 configured to intercommunicate with the transporters 2 through an electric communication line 6. In the system 1, the map server 4 distributes map information 10 to each transporter 2, and the transporter 2 determines, based on the map information 10, a travel route to be autonomously traveled by the transporter 2.

The transporter 2 is an autonomous traveling working machine that includes a machine body 8 having a loading platform on which a load is to be mounted, and transports a load to a destination of the load by autonomously traveling along indoor and outdoor travel route.

The transportation system 1 according to the present embodiment is configured to identify a travel plan for appropriately transporting a load based on its own traveling performance PA, travel tolerance PB of the load, and the map information 10 including travel road additional information PC. In the present embodiment, a travel plan includes an appropriate travel route and a plan of an appropriate traveling state of the transporter 2 on the travel route, and the transporter 2 autonomously travels according to the travel plan, which makes it possible to suppress the risk of damage or degradation (hereinafter, referred to as "damage or the like") to the contents of a load during transportation. The traveling performance PA of the transporter 2, and the travel tolerance of a load, and the travel road additional information PC will be described in detail later.

Figure 2:
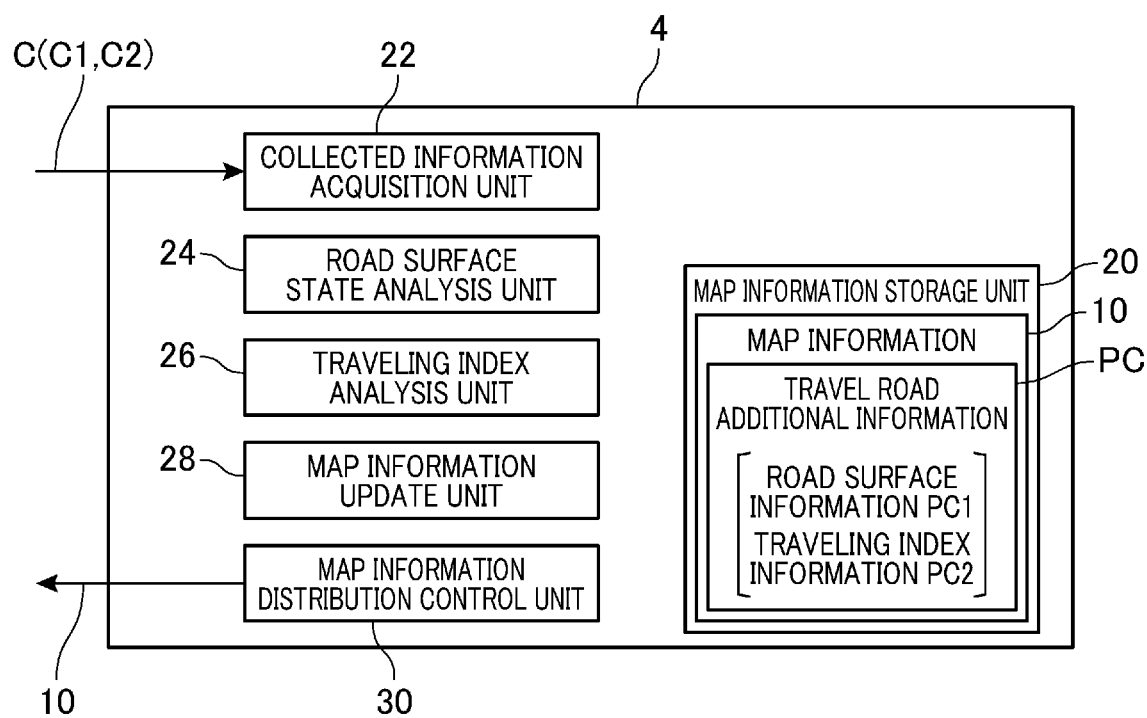
FIG. 2 is a diagram illustrating a functional configuration of a map server.

FIG. 2 is a diagram illustrating a functional configuration of the map server 4.

The map server 4 is a computer that includes a processor such as a CPU or an MPU, a memory such as a ROM or a RAM, a storage apparatus such as an HDD (Hard Disk Drive) or an SSD (Solid State Drive), an interface circuit for connecting sensors, peripheral devices and the like, and a communication apparatus (including a reception apparatus and a transmission apparatus) for communicating through the electric communication line 6. Then, the processor executes computer programs stored in the memory device or storage apparatus, and thereby the functional configuration illustrated in FIG. 2 is achieved.

That is, as illustrated in FIG. 2, the map server 4 has a functional configuration including a map information storage unit 20, a collected information acquisition unit 22, a road surface state analysis unit 24, a traveling index analysis unit 26, a map information update unit 28, and a map information distribution control unit 30. The CPU of the map server 4 functions as the collected information acquisition unit 22, the road surface state analysis unit 24, the traveling index analysis unit 26, the map information update unit 28, and the map information distribution control unit 30.

The map information storage unit 20 includes the above-described storage apparatus configured to store the map information 10.

The map information 10 is information indicating a travel road network covering many travel roads on which the transporter 2 can travel. The map information 10 of the present embodiment further includes the travel road additional information PC.

The travel road additional information PC includes information about vibration and inclination during traveling, for each travel road, and in the present embodiment, the travel road additional information PC includes information that makes it possible to estimate, for each traveling performance PA of the transporter 2, the magnitude of each of the vibration and the inclination during traveling, and the traveling state not causing the vibration exceeding the travel tolerance PB of the load. Specifically, the travel road additional information PC includes road surface information PC1 and traveling index information PC2.

The road surface information PC1 includes structural or physical information of a road surface causing the vibration and the inclination during traveling, and specifically includes step information, unevenness information, slope information, and pavement information. The step information is information indicating the presence or absence of a step in the road surface, and the magnitude of the step. The unevenness information is information indicating the presence or absence of unevenness in the road surface, and the degree of the unevenness. The slope information is information indicating the magnitude of a slope of the road surface. The pavement information is information indicating a pavement state (including material of the pavement) of the road surface.

The traveling index information PC2 includes information indicating the correspondence between the traveling state and the vibration of the transporter 2, and specifically includes information indicating the correspondence between inertia information and the vibration during traveling. The inertia information is information that can identify motions of the transporter 2, and specifically includes information about acceleration in a translational direction and angular velocity around the center of gravity of the transporter 2.

The collected information acquisition unit 22 receives collected information C using the communication apparatus, thereby acquiring the collected information C from the transporter 2. The collected information C is information used to generate the above-described travel road additional information PC, and the detail thereof will be described later.

The road surface state analysis unit 24 generates road surface information PC1 based on the collected information C, and the traveling index analysis unit 26 generates traveling index information PC2 based on the collected information C.

The map information update unit 28 updates corresponding information in the map information 10, based on the road surface information PC1 generated by the road surface state analysis unit 24 and the traveling index information PC2 generated by the traveling index analysis unit 26.

The map information distribution control unit 30 executes control for distributing the map information 10 from the communication apparatus to the transporter 2 through the electric communication line 6.

Figure 3:
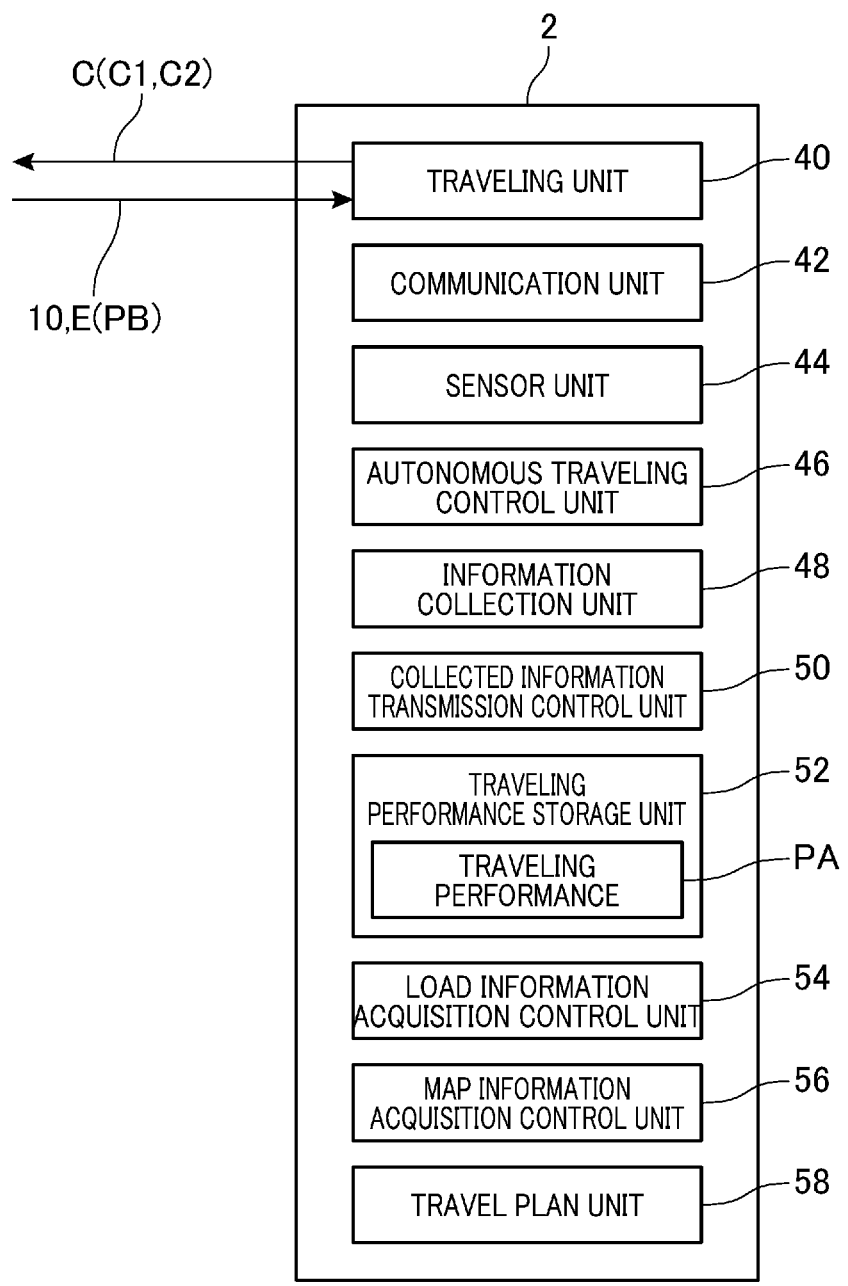
FIG. 3 is a diagram illustrating a functional configuration of an autonomous traveling transporter.

FIG. 3 is a diagram illustrating a functional configuration of the transporter 2.

The transporter 2 includes a traveling unit 40, a communication unit 42, a sensor unit 44, an autonomous traveling control unit 46, an information collection unit 48, a collected information transmission control unit 50, a traveling performance storage unit 52, a load information acquisition control unit 54, a map information acquisition control unit 56, and a travel plan unit 58. The transporter 2 includes a computer having a processor and a memory and the processor functions as functional units of the transporter 2.

The traveling unit 40 has mechanical elements and electric elements that are necessary for causing the machine body 8 of the transporter 2 to be moved by traveling, and specifically includes wheels, a steering mechanism for controlling a steering angle of the wheels, and a drive mechanism having a power source for driving the wheels. When the power source is an electric motor, the drive mechanism is provided with an inverter configured to drive the electric motor, a battery which is an energy source, a DCDC converter configured to convert electric power of the battery, and the like, for example. The power source of the drive mechanism may be an internal combustion engine, or a hybrid of an electric motor and an internal combustion engine.

The communication unit 42 includes a communication apparatus (apparatus including a reception circuit and a transmission circuit) configured to intercommunicate with the map server 4 through the electric communication line 6.

The sensor unit 44 includes one or a plurality of sensors configured to detect various kinds of information required for autonomous traveling control, a sensor configured to detect a road surface state, and a sensor configured to detect vibration occurring in the drive mechanism.

The sensors configured to detect various kinds of information required for autonomous traveling control include various sensors configured to detect at least a self-position and the above-described inertia information, and examples of the sensors used include a light detection and ranging (LiDAR), an acceleration sensor, a gyro sensor, a GNSS sensor, a sonar sensor, an imaging device (e.g., a CCD sensor), and a time-of-flight (TOF) camera. For the sensor configured to detect a road surface state, an imaging device is used, for example. For the sensor configured to detect vibration, a stroke sensor provided to a suspension of each wheel is used, for example.

The autonomous traveling control unit 46 includes a computer configured to execute autonomous traveling control to cause the traveling unit 40 to autonomously travel along a travel route. For such autonomous traveling control, a publicly known or well-known appropriate control method is used.

The information collection unit 48 includes a computer configured to generate the above-described collected information C based on a detection signal detected by the sensor unit 44 during autonomous traveling.

The collected information C is information collected through autonomous traveling of the transporter 2 on travel roads, and includes road surface state detection information C1 indicating detection results of road surface states of the travel roads and traveling state detection information C2 indicating detection results of traveling states of the transporter 2 itself.

Examples of the road surface state detection information C1 includes a photographed image of a road surface, and structural data obtained by probing the road surface with the sonar sensor or the like.

The traveling state detection information C2 includes at least the above-described inertia information and vibration detection results, and further includes information (for example, weight, sizes (width, total length, and height of the machine body) and a position of the center of gravity of the transporter 2) that makes it possible to identify motions (translational motion and rotational motion around the center of gravity) of the transporter 2 based on the inertia information.

The traveling performance storage unit 52 includes the storage apparatus (memory) configured to store the above-described traveling performance PA of the transporter 2.

The traveling performance PA is information indicating performance related to traveling of the transporter 2 itself, that is, performance concerning the vibration and the inclination during traveling. The traveling performance PA of the present embodiment is also information that makes it possible to estimate the vibration and the inclination which occur while the transporter 2 travels on the travel road, based on the travel road additional information PC of the map information 10, and includes information of braking performance and uphill traveling performance of the transporter 2 itself, information (sizes and the like) of tires mounted to the respective wheels, information (vibration suppression performance and the like) of the suspension, weight and sizes (width, total length, and height of the machine body), a shape and a position of the center of gravity of the transporter 2, and the like. The weight and the position of the center of gravity of the transporter 2 include at least values when a load is mounted on the transporter 2, and even when the sizes and weight of the load are changed for each transportation, the vibration and the inclination can be accurately estimated using the weight and the position of the center of gravity at that time.

The load information acquisition control unit 54 controls the communication unit 42 to acquire load information E from an appropriate electric communication apparatus 70 (FIG. 1) owned by a carrier D (FIG. 1). The load information E is information about a load to be transported by the transporter 2, and includes at least the above-described travel tolerance PB.

The travel tolerance PB is information indicating tolerance of the load (more specifically, the contents of the load) with respect to traveling of the transporter 2. In the present embodiment, the travel tolerance PB includes information indicating the resistance of the contents of the load to damage or the like caused by the vibration and the inclination, and specifically includes vibration tolerance information PB1 which is an evaluation value for the resistance to damage or the like caused by the vibration, and inclination tolerance information PB2 which is an evaluation value for the resistance to damage or the like caused by the inclination.

In the present embodiment, the evaluation of the travel tolerance PB is made by the carrier D. In the case where the travel tolerance PB has already been evaluated by a delivery source of the load, the carrier D adopts the evaluation result of the delivery source.

In the present embodiment, a predefined value for the evaluation value of the travel tolerance PB is preset for each item (for example, foodstuffs, clothes, fragile articles, precision devices, or the like) of the contents of the load. Then, the carrier D checks an item of the load to evaluate the travel performance PB, and inputs the predefined set value corresponding to the item to the electric communication apparatus, and the electric communication apparatus transmits the evaluation value as the travel performance PB to the transporter 2 through the electric communication line 6.

Note that the electric communication apparatus may transmit the load information E (the travel tolerance PB of the load) to the transporter 2 through direct communication with the transporter 2 without passing through the electric communication line 6, or the carrier D may input the load information E directly from an appropriate user interface device provided in the transporter 2. That is, the load information E may be input to the transporter 2 (the travel plan unit 58) by appropriate means.

Alternatively, the carrier D may evaluate the travel tolerance PB of each load according to the contents, without using the predefined set value for each item.

The map information acquisition control unit 56 includes a computer configured to control the communication unit 42 to acquire, from the map server 4, the map information 10 including an area from a departure point to a destination.

The travel plan unit 58 includes a computer configured to identify a travel route and an autonomous traveling state in the travel route based on the traveling performance PA, the travel tolerance PB of the load, and the map information 10 including the travel road additional information PC.

Note that in the transporter 2, all or some of the computers included in the autonomous traveling control unit 46, the information collection unit 48, the collected information transmission control unit 50, the load information acquisition control unit 54, the map information acquisition control unit 56, and the travel plan unit 58 may be implemented by one computer. The computer is an apparatus that includes a processor such as a CPU or an MPU, a memory device such as a ROM or a RAM, and an interface circuit for connecting sensors, peripheral devices and the like.

Figure 4:
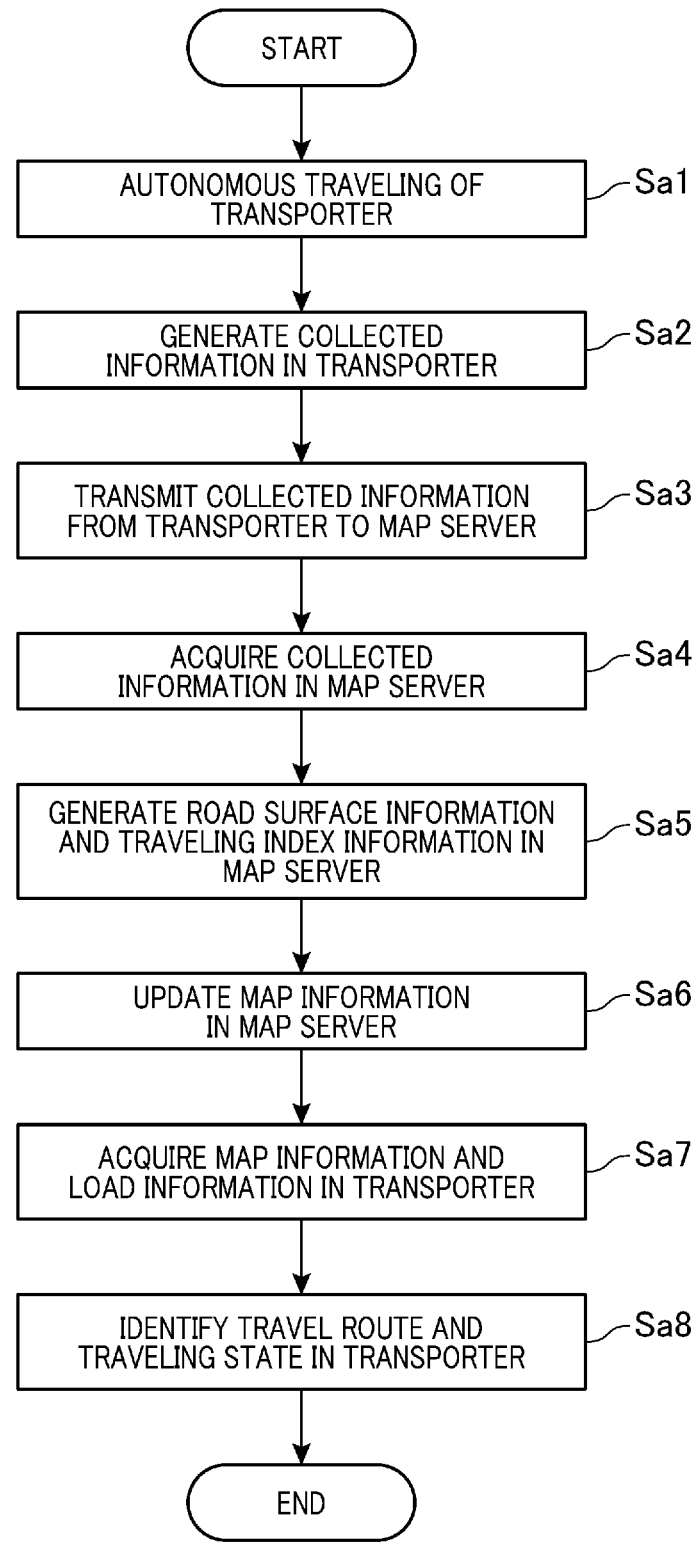
FIG. 4 is a diagram illustrating operations of the transportation system.

FIG. 4 is a diagram illustrating operations of the transportation system 1.

In the transportation system 1, when the transporter 2 autonomously travels (step Sa1), the information collection unit 48 generates collected information C based on a detection signal of the sensor unit 44 for the autonomous traveling (step Sa2), and the collected information transmission control unit 50 controls the communication unit 42 to transmit the collected information C to the map server 4 (step Sa3).

Through such operations, the collected information C is transmitted to the map server 4 each time the transporter 2 autonomously travels, and is stored in the map server 4.

On the other hand, in the map server 4, when the collected information acquisition unit 22 acquires the collected information C (step Sa4), the road surface state analysis unit 24 generates road surface information PC1 based on the collected information C, and the traveling index analysis unit 26 generates traveling index information PC2 based on the collected information C (step Sa5). This makes it possible to identify the travel road additional information PC about the travel road autonomously traveled by the transporter 2.

Specifically, the road surface state analysis unit 24 analyzes the road surface state detection information C1 included in the collected information C using a publicly known or well-known appropriate method, thereby extracting structural or physical elements of the road surface causing the vibration and the inclination during traveling of the transporter 2, and generating the road surface information PC1 based on the extraction results. For example, when the road surface state detection information C1 is a photographed image of the road surface, the road surface state analysis unit 24 performs image analysis of the photographed image to extract the above-described elements.

The traveling index analysis unit 26 identifies the traveling states (inertia information or the like) of the transporter 2 and the magnitude of the vibration at that time, based on the traveling state detection information C2 included in the corrected information C, and generates the traveling index information PC2 based on the identification results.

Then, the map information update unit 28 updates the travel road additional information PC of the map information 10 based on the road surface information PC1 and the traveling index information PC2 which are generated in step Sa5 (step Sa6). In this way, the collected information C (the surface road state detection information C1 and the traveling state detection information C2) collected from the transporter 2 is reflected in the map information 10.

Note that the processing of steps Sa5 and Sa6 is performed at an appropriate execution timing. For example, the processing may be performed at certain time intervals or may be performed each time a certain number of pieces of collected information C are newly acquired.

Then, to transport the load, the transporter 2 acquires, from the map server 4, the map information 10 including the area from the departure point to the destination under control of the map information acquisition control unit 56, and acquires the load information E from the electric communication apparatus 70 under control of the load information acquisition control unit 54 (step Sa7).

Figure 5:
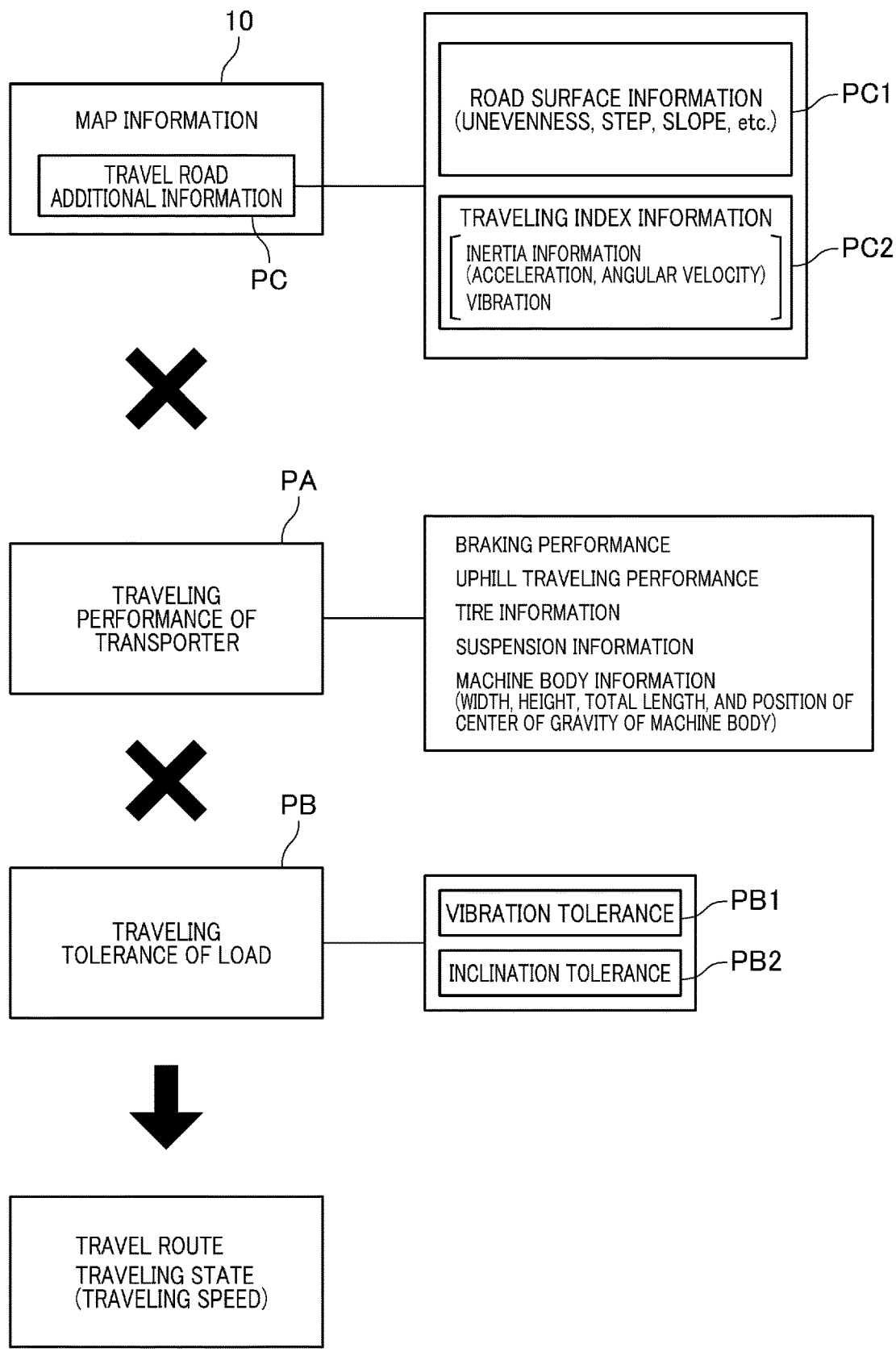
FIG. 5 is a diagram schematically illustrating a method of identifying a travel route and a traveling state.

Then, as illustrated in FIG. 5, the travel plan unit 58 identifies a travel route and an autonomous traveling state in the travel route while reflecting all of the traveling performance PA, the travel tolerance PB of the load, and the travel road additional information PC, based on the traveling performance PA, the travel tolerance PB of the load, and the map information 10 including the travel road additional information PC (step Sa8).

Specifically, the travel plan unit 58 identifies candidates of the travel route from the departure point to the destination, based on the map information 10. Next, the travel plan unit 58 identifies, among the candidates, a candidate that makes it possible to travel so that the vibration and the inclination during traveling fall within a range of the travel tolerance PB of the load based on the traveling performance PA and the travel road additional information PC, and sets the identified candidate to the travel route. That is, the travel plan unit 58 estimates the magnitude of each of the vibration and the inclination during traveling based on the traveling performance PA and the travel road additional information PC, for each candidate of the travel route, and compares the estimation result with the travel tolerance PB of the load to identify the travel route that makes it possible to travel within a range of the travel tolerance PB of the load.

In this case, since the traveling performance PA includes the weight and the position of the center of gravity of the transporter 2 on which a load to be transported this time is mounted, the vibration and the inclination can be accurately estimated, which makes it possible to set the appropriate travel route suited to the present load loading situation.

Note that when the transporter 2 transports a plurality of loads, the travel plan unit 58 identifies the travel route and the traveling state based on the travel tolerance PB which is the lowest among the loads.

Furthermore, to identify the travel route, the travel plan unit 58 identifies travel roads including unevenness having sizes large enough to fit a tire, a step causing a large impact, or a slope which may cause losing balance and falling over at the time of passage of the transporter 2, based on the road surface information PC1 of the travel road additional information PC, and the traveling performance PA (tire size, suspension performance, and the like) of the transporter 2, and excludes such travel roads from the travel route.

This can reliably avoid the travel roads which may cause the transporter 2 to be incapacitated by getting stuck, receiving a strong impact, falling over, or the like.

Next, the travel plan unit 58 identifies, in the identified travel route, inertia information so that the vibration and the inclination does not exceed the travel tolerance PB of the load in the identified travel route, based on the travel road additional information PC, the traveling performance PA, and the travel tolerance PB, and identifies, as the traveling state, the traveling speed determining the acceleration and the angular velocity, which are indicated in the inertia information. Also as the inertia information, the appropriate information suited to the present load loading situation is identified in the same manner as in the above-described identification of the travel route.

The autonomous traveling control unit 46 executes the autonomous traveling control according to the identified autonomous traveling state (traveling speed), whereby the transporter 2 can autonomously travel to the destination along the travel route at the traveling speed not causing the vibration exceeding the travel tolerance PB of the load.

According to the present embodiment, the following effects can be obtained.

A transportation system 1 of the present embodiment is a system that includes an autonomous traveling transporter 2 configured to transport a load.

The transportation system 1 includes a map information storage unit 20 configured to store map information 10 including travel road additional information PC about travel roads of the transporter 2 and vibration and inclination during traveling on the travel roads, a collected information acquisition unit 22 configured to acquire collected information C collected through autonomous traveling of the transporter 2 on the travel roads, a map information update unit 28 configured to update the travel road additional information PC of the map information 10 corresponding to the travel roads autonomously traveled by the transporter 2 based on the collected information C, and a travel plan unit 58 configured to identify a travel plan of the transporter 2 autonomously traveling to transport the load, based on the map information 10 including the travel road additional information PC and travel tolerance PB indicating tolerance of the load with respect to traveling.

According to the transportation system 1, the travel road additional information PC of the map information 10 is successively updated based on the collected information collected through the autonomous traveling of the transporter 2, whereby the travel road additional information PC can be maintained up-to-date.

In addition, since the travel plan is identified based on the map information 10 including the travel road additional information PC and the travel tolerance PB of the load, the autonomous traveling can be planned so that the vibration and the inclination can fall within a range of the travel tolerance PB of the load, which makes it possible to suppress the risk of damage or degradation to the contents of the load during transportation.

In the present embodiment, the above-described travel plan unit 58 identifies the travel plan based on the map information 10, the travel tolerance PB of the load, and the traveling performance PA of the transporter 2.

This makes it possible to establish the travel plan so that the vibration and the inclination do not exceed the travel tolerance PB of the load for each of transporters 2 having different traveling performance PA.

In the present embodiment, the travel plan includes a travel route to be autonomously traveled by the transporter 2 and a traveling state of the transporter 2 during autonomous traveling.

This makes it possible to identify the travel route including no travel roads causing the vibration and the inclination exceeding the travel tolerance PB of the load, and the traveling state not causing the vibration and the inclination.

In the present embodiment, the above-described travel road additional information PC includes road surface information PC1 including structural or physical information of a road surface causing vibration and inclination during traveling.

In this way, the travel plan unit 58 can identify travel roads including unevenness having sizes large enough to fit a tire, a step causing a large impact, or a slope which may cause losing balance and falling over at the time of passage of the transporter 2, based on the road surface information PC1 and the traveling performance PA (tire size, suspension performance, and the like) of the transporter 2, and exclude such travel roads from the travel route. Accordingly, this can reliably avoid the travel roads which may cause the transporter 2 to be incapacitated by getting stuck, receiving a strong impact, falling over, or the like.

In the present embodiment, the above-described travel road additional information PC includes traveling index information PC2 including information indicating the correspondence between a traveling state and vibration.

In this way, the travel plan unit 58 can identify the traveling state in which the vibration does not exceed the travel tolerance PB, based on the traveling index information PC2.

In the present embodiment, the above-described traveling index information PC2 includes the correspondence between inertia information and vibration of the transporter 2.

In this way, the travel plan unit 58 can identify the traveling speed which is one of the traveling states, based on the traveling performance PA of the transporter 2.

In the present embodiment, the above-described travel tolerance PB of the load includes information indicating resistance of contents of the load to damage or degradation caused by vibration and inclination.

In this way, the travel plan unit 58 can identify, with higher certainty, the travel route and the traveling state which make it possible to suppress the risk of damage or degradation to the contents of the load during transportation, using the travel tolerance PB of the load.

In the present embodiment, when the transporter 2 transports a plurality of loads, the travel plan unit 58 identifies the travel route and the traveling state based on the travel tolerance PB which is the lowest among the loads.

This makes it possible to suppress the damage or the degradation to the contents of all the loads, even when the transporter 2 transports a plurality of loads at a time.

The above-described embodiment is merely illustrative of one aspect of the present invention, and can be arbitrarily modified or applied without departing from the spirit of the present invention.

In the above-described embodiment, when the transporter 2 transports a load for which damage or the like caused by vibration is not a concern, various kinds of information including the travel tolerance PB of the load and the travel road additional information PC of the map information 10 need not include the information about vibration, and it is only required that the travel plan unit 58 identify the travel plan so that the inclination does not exceed the travel tolerance PB.

In the above-described embodiment, the travel plan unit 58 need not identify both of the travel route and the traveling state, and may identify only one of them.

In the transportation system 1 of the above-described embodiment, the transporter 2 includes the travel plan unit 58. However, another computer communicably connected to the map server 4 or the electric communication line 6 may include the travel plan unit 58.

When the map server 4 includes the travel plan unit 58, this makes it possible to configure the travel plan server and the travel plan system that plan the travel route and the traveling state of the transporter 2.

In the transportation system 1 of the above-described embodiment, the map server 4 includes a configuration (the collected information acquisition unit 22, the road surface state analysis unit 24, the traveling index analysis unit 26, and the map information update unit 28) related to the configuration of the map information 10. However, another computer communicably connected to the transporter 2 or the electric communication line 6 may include such a configuration, for example.

In the transportation system 1 of the above-described embodiment, the road surface state analysis unit 24 generates the road surface information PC1 based on the collected information C collected by the transporter 2. However, the road surface state analysis unit 24 may generate the road surface information PC1 based on the state of the road surface detected by a traveling body or a moving body (drone or the like) which is different from the transporter 2, for example.

REFERENCE SIGNS LIST

1 Transportation system
2 Transporter
4 Map server
10 Map information
20 Map information storage unit (map information storage means)
22 Collected information acquisition unit (collected information acquisition means)
28 Map information update unit (map information update means)
46 Autonomous traveling control unit
58 Travel plan unit
C Collected information
PA Traveling performance
PB Travel tolerance
PB1 Vibration tolerance information
PB2 Inclination tolerance information
PC Travel road additional information
PC1 Road surface information
PC2 Traveling index information

What is claimed is:

1. A transportation system including the following elements each connected communicatively through an electric communication line: an autonomous traveling transporter; an electric communication apparatus; and a map server, the autonomous traveling transporter configured to transport a load, and the electric communication apparatus owned by a carrier, wherein
the autonomous traveling transporter includes a transporter processor and a memory,
in the memory, traveling performance including a weight and a position of a center of gravity of the autonomous traveling transporter when the load is mounted on the autonomous traveling transporter is stored,
the transporter processor:
stores map information including travel road additional information about travel roads on which the autonomous traveling transporter autonomously travels and an inclination of the travel roads;
acquires collected information collected through the autonomous traveling of the autonomous traveling transporter on the travel roads;
updates the travel road additional information, of the map information corresponding to the travel roads that the autonomous traveling transporter autonomously travels, based on the collected information;
identifies a travel plan of the autonomous traveling transporter, the travel plan including a travel route that the autonomous traveling transporter autonomously travels to transport the load, and an autonomous traveling state of the autonomous traveling transporter on the travel route, based on the map information distributed from the map server including the travel road additional information, a travel tolerance that is obtained from the electric communication apparatus indicating a tolerance of the load with respect to the autonomous traveling of the autonomous traveling transporter, and the traveling performance stored in the memory;
generates the collected information including a photographed image of a road surface of the travel road collected through the autonomous traveling of the autonomous traveling transporter and traveling state detection information collected through the autonomous traveling of the autonomous traveling transporter, the traveling state detection information indicating a detection result associated with at least one of acceleration in a translational direction of the autonomous traveling transporter during traveling, angular velocity around the center of gravity of the autonomous traveling transporter, and vibration of the autonomous traveling transporter;
transmits the collected information to the map server; and
identifies the travel state on the travel route identified, and executes autonomous traveling control of the autonomous traveling transporter according to the travel state identified,
the map server includes a server processor that analyzes the collected information transmitted from the autonomous traveling transporter and generates the travel road additional information, and
the travel road additional information includes road surface information and traveling index information, the road surface information is generated by analyzing the photographed image of the road surface of the travel road and includes a structural or physical element of the road surface causing the vibration and the inclination during the autonomous traveling of the autonomous traveling transporter, and the traveling index information indicates a correspondence between the autonomous traveling state and a magnitude of the vibration of the autonomous traveling transporter specified from the traveling state detection information.

2. The transportation system according to claim 1, wherein
the travel tolerance of the load includes a predetermined evaluation value indicating resistance of contents of the load to damage or degradation caused by inclination.

3. The transportation system according to claim 1, wherein
the travel tolerance of the load includes a predetermined evaluation value indicating resistance of contents of the load to damage caused by vibration.

4. The transportation system according to claim 1, wherein
when the autonomous traveling transporter transports a plurality of loads, the transporter processor identifies the travel plan based on the travel tolerance which is the lowest among the plurality of loads.

5. The transportation system according to claim 1, wherein
the autonomous traveling transporter is a first autonomous traveling transporter of a plurality of autonomous traveling transporters within the transportation system, and the server processor analyzes the collected information obtained from each of the plurality of autonomous traveling transporters and generates the travel road additional information.

* * * * *